United States Patent
Pionetti et al.

(10) Patent No.: US 11,441,719 B2
(45) Date of Patent: Sep. 13, 2022

(54) METHOD AND DEVICE FOR INDUCTION HEATING OF AN INNER PIPE OF AN ASSEMBLY OF COAXIAL PIPES

(71) Applicant: SAIPEM S.A., Montigny le Bretonneux (FR)

(72) Inventors: François-Régis Pionetti, La Baleine (FR); Axel Sundermann, Fontenay-les-Briis (FR); Taoufik Majdoub, Bobigny (FR); Jalil Agoumi, Le Kremlin-Bicetre (FR)

(73) Assignee: SAIPEM S.A., Montigny le Bretonneux (FR)

( * ) Notice: Subject to any disclaimer, the term of this patent is extended or adjusted under 35 U.S.C. 154(b) by 564 days.

(21) Appl. No.: 16/347,515

(22) PCT Filed: Oct. 24, 2017

(86) PCT No.: PCT/FR2017/052930
§ 371 (c)(1),
(2) Date: May 3, 2019

(87) PCT Pub. No.: WO2018/083396
PCT Pub. Date: May 11, 2018

(65) Prior Publication Data
US 2019/0285219 A1 Sep. 19, 2019

(30) Foreign Application Priority Data
Nov. 4, 2016 (FR) ...................... 1660717

(51) Int. Cl.
*H05B 6/10* (2006.01)
*F16L 53/34* (2018.01)

(52) U.S. Cl.
CPC .............. *F16L 53/34* (2018.01); *H05B 6/101* (2013.01)

(58) Field of Classification Search
CPC ................................. F16L 53/34; H05B 6/101
(Continued)

(56) References Cited

U.S. PATENT DOCUMENTS 4,538,682 A * 9/1985 McManus ............... E21B 37/00
166/304
4,595,607 A 6/1986 Betteridge
(Continued)

FOREIGN PATENT DOCUMENTS

DE 2136656 2/1973
DE 19718790 11/1998
(Continued)

*Primary Examiner* — Quang T Van
(74) *Attorney, Agent, or Firm* — Cozen O'Connor (57) ABSTRACT

A method of heating an inner pipe of a set of coaxial pipes, wherein the inner pipe is heated by induction using an electromagnetic induction coil (5) surrounding the outer pipe coaxially, the coil passing electrical power at a frequency lower than 100 Hz optimized for maximum energy efficiency of Joule effect heating of the inner pipe. A device (8) is also provided for induction heating an inner pipe of coaxial pipes, the device has a) an induction heater having at least one electromagnetic induction coil (5) coaxially surrounding the outer pipe of the coaxial pipes, and b) a raising device (9) for raising a portion (1-2) of coaxial pipes (1) above the sea bed (13) together with the induction coil(s) (5) surrounding it.

18 Claims, 4 Drawing Sheets

(58) Field of Classification Search
USPC .............. 219/630, 629, 633, 634, 635, 622;
156/272.4, 274.2; 264/403, 472, 486,
264/487; 166/48, 61
See application file for complete search history.

(56) References Cited

U.S. PATENT DOCUMENTS

| | | | |
|---|---|---|---|
| 6,278,095 | B1 | 8/2001 | Bass |
| 6,278,096 | B1 | 8/2001 | Bass |
| 6,509,557 | B1 * | 1/2003 | Bass .................. H05B 6/108 219/772 |
| 2012/0031621 | A1 | 2/2012 | Fowler |
| 2013/0098625 | A1 | 4/2013 | Hickman |
| 2013/0220996 | A1 | 8/2013 | Liney |
| 2013/0228265 | A1 | 9/2013 | Tailor |
| 2014/0305613 | A1 | 10/2014 | Barendregt et al. |

FOREIGN PATENT DOCUMENTS

| | | |
|---|---|---|
| EP | 0 722 824 | 7/1996 |
| EP | 2452805 | 5/2012 |
| EP | 2886285 | 6/2015 |
| GB | 2531026 | 4/2016 |
| JP | H03129195 | 6/1991 |
| JP | H0584829 | 4/1993 |
| JP | H09150458 | 6/1997 |
| WO | WO 9628683 | 9/1996 |
| WO | WO2004106038 | 12/2004 |
| WO | WO2007128384 | 11/2007 |
| WO | WO 2010/041016 | 4/2010 |
| WO | WO 2012/017171 | 2/2012 |
| WO | WO 2012051719 | 4/2012 |

* cited by examiner

METHOD AND DEVICE FOR INDUCTION HEATING OF AN INNER PIPE OF AN ASSEMBLY OF COAXIAL PIPES

PRIORITY CLAIM

This is a U.S. national stage of application No. PCT/FR2017/052930, filed on Oct. 24, 2017. Priority is claimed on France Application No. FR1660717, filed Nov. 4, 2016, the content of which is incorporated here by reference.

BACKGROUND OF THE INVENTION

The present invention relates to the general field of heating metal pipes for transporting fluids, and in particular undersea pipes resting on the sea bottom and providing a connection between undersea wells producing hydrocarbons, in particular oil and gas, and a surface installation, e.g. a floating production, storage, and off-loading unit.

In a given offshore hydrocarbon production field, it is common practice to work a plurality of wells that may be spaced apart from one another by several kilometers, or even tens of kilometers. The fluids coming from those various wells need to be collected by undersea pipes made of metal (typically of steel) placed on the sea bottom, and they need to be transferred by bottom-to-surface connection pipes (or "risers") to a surface installation, e.g. a ship or a collection point on land, where they are collected in order to be stored (and possibly to be processed).

The fluids coming from production wells tend to cool down very quickly on travelling the numerous kilometers of undersea pipes. Unfortunately, if no precautions are taken for conserving some minimum threshold temperature inside those pipes, there is a major risk of gas molecules that are contained in the fluids being transported, and in particular methane molecules, combining with molecules of water so as to form hydrate crystals at temperatures that are low, less than 20° C. These crystals can become stuck to the walls and can aggregate thereon, leading to plugs being formed that are capable of blocking the flow of fluids inside the pipes. Likewise, the solubility in oil of compounds of high molecular weight, such as paraffins or asphaltenes, decreases with decreasing temperature, thereby giving rise to solid deposits that are likewise capable of blocking flow. Hydrates can plug the pipes irreversibly if too great a length of a pipeline drops to too low a temperature. This problem can appear under two main circumstances:

when offshore production is stopped; and
when offshore production or transport pipelines are very long.

One of the known solutions seeking to remedy that problem consists in heating pipes by using round or flat electric cables that are wound around the steel pipes over their entire length to order to heat those pipes by the Joule effect. The electrical power that is supplied to the electric cables comes from an external electricity generator connected to the cables by an umbilical. That electric heating solution is referred to by the term "heat tracing" and it serves to maintain the fluids that are being transported in the pipes at a temperature higher than a critical threshold over their entire path from the production well to the surface installation.

From US 2013/098625A1, US 2013/220996A1, US 2014/305613A1, and US 2012/031621A1, methods are known for heating the inside of a single pipe or tube by using an electromagnetic induction coil arranged around the single pipe or tube. For offshore applications, the element for heating is always a conductive fluid pipe, which is usually made of ferromagnetic steel. The pipe then heats the fluid being transported by various heat transfer phenomena. In practice, in the state of the art of induction heating a single pipe, electricity is used at a frequency higher than 1 kilohertz (kHz). The coil passing that electricity creates a magnetic field that induces eddy currents which, in conventional induction heating, are distributed over the surface of the pipe for heating over a thickness of the order of 1 millimeter (mm). The remainder of the tube and the elements inside the tube are heated indirectly by heat transfer effects. In prior art induction heating, the power given off by the Joule effect in a layer having a thickness of 1 mm or less on the outer wall of the steel tube increases in proportion to the square of the current flowing in the induction coil and to the square of the frequency of that current.

In U.S. Pat. No. 6,278,096, an electrically insulating thermoplastic coating on the outer surface of a single pipe (i.e. not a set of two coaxial pipes of the PIP type) is heated at the weld between two pipe segments by induction heating the thickness of the wall of the pipe having the thermoplastic coating that is to be repaired.

U.S. Pat. No. 6,278,095 relates to heating short segments of single pipes known as "single heated insulated pipelines" (SHIPs), which segments are referred to as "jumpers" (see column 3, lines 19 to 22). The intention is to mitigate the absence of coating containing the Joule effect electric heating cables on said jumpers that provide junctions between two pipe portions that include such coatings containing electric heater cables, by using induction heating by means of an induction coil surrounding said jumper.

SUMMARY OF THE INVENTION

The present invention relates more precisely to sets comprising two coaxial undersea pipes of the pipe-in-pipe (PIP) type, in which an inner tube transports the fluids and an outer tube coaxial about the inner tube, also referred to as the outer jacket, is in contact with the surrounding medium, i.e. water. The annular space between the two tubes may be filled with an insulating material, or indeed it may be evacuated of gas so as to provide thermal insulation for the fluids flowing in the inner pipe. Such undersea coaxial pipes are used in particular in the context of installations at great depths where the temperature of the water is typically 4° C. and where the fluids in the pipelines must necessarily be maintained at temperatures higher than 20° C. in order to prevent hydrates forming.

In prior art induction heating of undersea pipes, there is no description of using induction heating to heat the inner pipe of two coaxial pipes of the PIP type. In order to heat the inner tube of a PIP type pipe from an induction coil arranged around the outer tube, the magnetic field needs to be capable of passing through the outer tube, which requires the operating frequency of the coil producing the magnetic field to be such that the characteristic penetration depth of the magnetic field in the outer tube (also known as its "skin" depth) to be greater than the thickness of the outer tube in order to be able to reach the inner tube. This is done by lowering the frequency. However, it is also necessary to keep this frequency as high as possible in order to maximize the Joule effect power that is induced in the element for heating inside the outer tube. That is why it is not possible with conventional induction methods to heat the inner tube of a PIP comprising one thick steel tube inside another thick steel tube of the kind used in the offshore oil industry, by using induction obtained from a varying magnetic field created outside the outer tube. Specifically, a pipe of the kind that is used as the outer tube of a PIP type undersea pipe having a thickness of 10 mm or more and made of ferromagnetic steel constitutes a barrier against induction heating of the inner tube using electricity at medium or high frequency higher than 1 kHz (in particular because of its conductivity and its magnetic permeability), since the penetration depth of the magnetic field in that material is then small, being of millimeter order at most for steel. The magnetic field therefore does not pass through the barrier of the outer tube, and all of the energy is dissipated in the outer tube. Conventional induction heating therefore does not enable conductive elements to be induction heated through such a barrier.

Nevertheless, the present invention has discovered that it is possible to determine optimum conditions for using Joule effect heating by means of currents induced by electromagnetic induction in the steel wall of the inner pipe in order to heat the thermally insulated inner pipe in an undersea PIP type pipe having its outer pipe made of steel. Heat is then transmitted immediately by heat transfer to the inside of the pipe and prevents hydrates forming or serves to melt any hydrates already present in the inner pipe of a PIP at 4° C. in deep sea.

In practice, it is estimated that it suffices to heat the inner pipe and the inside of the inner pipe to no more than 20° C. above the temperature of the surrounding water for the purpose of breaking up hydrates and/or preventing them forming.

Furthermore, given the thicknesses of said inner and outer pipes, and given the thermal capacity of the steel usually used in offshore pipes and the annular thermal insulation of the inner pipes of PIP type of the kind generally used in the offshore oil industry, a hot inner pipe at a temperature of more than 40° C. does not drop to below 20° C. in 24 hours (h) in a PIP environment at 4° C.

In the present invention, it has been discovered that with an electromagnetic induction coil surrounding the steel outer pipe and conveying electricity at a low frequency in a low frequency range of 0.1 hertz (Hz) to 10 Hz, and for which energy efficiency is maximized (in terms of Joule effect losses in the inner steel pipe), sufficient useful Joule effect heating power of the inner pipe in the range 1 kilowatt (kW) to 200 kW is obtained per machine for heating such an inner pipe, thereby raising the temperature of the inner pipe up to 40° C. in an environment at 4° C. at a rate of at least 100 meters per day (m/day) or indeed up to 10 kilometers per day (km/day) depending on the diameter of the inner pipe and on the physical properties of the contents to be heated, in particular for inner pipes of standard diameter and thicknesses, i.e. inner pipes having outside diameters in the range 2 inches (") to 12". For inner and outer pipe thicknesses lying in the range 10 mm to 30 mm, the thickness of the thermal insulation as described above, with an outer pipe having thickness less than or equal to the thickness of the inner pipe and if the inner tube is full of water or of a fluid having thermal capacity less than that of water, it is estimated that it is possible to unplug up to 10 kilometers per day and per machine of PIP pipeline in which the inner tube has an outside diameter of less than 4", and up to 1.5 kilometers per day and per machine for an inner tube having an outside diameter of less than 12" with a system that requires a topside electrical power supply at a power of less than 1 megawatt (MW).

This makes it possible to maintain an inner pipe having a length of n km at a temperature that is more than 20° C. higher than ambient temperature for 24 h by moving the heater device that is placed around the pipe at a speed of n km/day, in particular when restarting production after it has been stopped for a length of time that has led to the pipes becoming plugged by solidified hydrates.

More precisely, the present invention provides a method of heating an inner pipe of a set of coaxial steel pipes comprising a said inner pipe and an outer pipe, preferably a set of two undersea PIP type coaxial pipes, preferably in which the inner pipe is thermally insulated, the method being characterized in that the inner pipe is heated by induction using an electromagnetic induction coil surrounding the outer pipe coaxially, the coil passing electrical power at a frequency lower than 100 Hz optimized for maximum energy efficiency of Joule effect heating of the inner pipe, preferably at a frequency in the range 0.1 Hz to 10 Hz.

The induction heating operates independently of whether the inner pipe is thermally insulated, but the heating of the invention is more effective and easier if the inner pipe is insulated. More particularly, the electromagnetic induction coil generates a magnetic field of strength of at least 0.1 teslas (T), preferably in the range 0.1 T to 0.2 T, with electrical power at an optimum frequency in the range 1 Hz to 10 Hz in order to obtain heating power of the inner pipe in the range 1 kW to 200 kW, preferably of at least 5 kW.

Still more particularly, these values for field strength and power are appropriate for pipes presenting the following characteristics:

outside diameter of said inner pipe lies in the range 5 centimeters (cm) to 40 cm;

outside diameter of said outer pipe lies in the range 7.5 cm to 50 cm; and the thicknesses of said inner and outer pipes lie in the range 10 mm to 30 mm, the outer pipe preferably having thickness of the same order of magnitude as the thickness of the inner pipe.

The values for field strength and electrical power are appropriate regardless of the diameter of the pipe. However the power serving to generate sufficient electrical power for heating increases with increasing diameter for heating.

Still more particularly, the method of the invention is performed when restarting an undersea pipe after production has been stopped leading to a risk of hydrate plugs forming, the method serving to destroy said plugs. For this purpose, the inner pipe of a set of two undersea PIP type coaxial pipes is heated so as to maintain its temperature at at least 20° C. above the temperature of the water surrounding the outer pipe and to do so for a given duration that is preferably at least 24 h.

Preferably, the inner pipe is heated to 40° C., the inner and outer steel pipes presenting the thermal capacity characteristics of pipe steels and the thermal insulation of the annular space between the inner and outer pipes being such that the time required for cooling from 40° C. to 20° C. is at least 24 h.

In a first implementation, a movable induction heater device is used including at least one said electromagnetic induction coil surrounding the outer pipe coaxially, and said movable heater device is moved along said set of coaxial pipes, preferably at a speed of at least 1 km/day.

More particularly, the inner pipe is heated to a temperature T2 with a movable induction heater device including a said electromagnetic induction coil surrounding the outer pipe coaxially, and said movable heater device is moved at a speed of at least n km/day so that the temperature of the inner pipe for a given length of pipe remains greater than T1 less than T2, where T2-T1 is greater than the temperature drop of the inner pipe over one day.

Still more particularly, T1 is greater than 20° C. and T2 is greater than 40° C.

More particularly, the following steps are performed:

a) raising a portion of coaxial pipes resting on the sea bed, said pipe portion having at least one said induction coil arranged coaxially around the outer pipe; and b) moving a movable induction heater device that includes at least one said electromagnetic induction coil lengthwise relative to and along said coaxial pipes while simultaneously raising a new portion of coaxial pipes.

In an implementation, a removable induction heater device is used that is suitable for being applied on coaxial pipes resting on the sea bottom, said device including a said electromagnetic induction coil comprising two independent semi-cylindrical coil portions suitable for being secured to each other in order to form a coaxial coil surrounding said outer pipe when raised above the sea bed.

The present invention also provides a device for induction heating an inner pipe of coaxial pipes, the device being suitable for use in a method of the invention, and comprising:

induction heater means comprising at least one electromagnetic induction coil coaxially surrounding the outer pipe of the coaxial pipes; and raising means for raising a portion of coaxial pipes above the sea bed together with said induction coil(s) surrounding it.

In an embodiment, the device is a movable device further comprising:

motor-driven movement means suitable for enabling said induction coil(s) to move coaxially along the outer pipe of the coaxial pipes; and said raising means for raising a portion of coaxial pipes above the sea bed together with said induction coil(s) surrounding it and said motor-driven movement means.

Still more particularly, the raising means comprise buoys that can be ballasted or deballasted in controlled manner.

Still more particularly, the motor-driven movement means comprise crawler devices suitable for bearing against the outer pipe and thus for moving along the outer pipe when they are actuated, said coils sliding coaxially relative to said outer pipe.

Still more particularly, said raising means comprise rollers supporting the outer pipe and suitable for sliding relative to said outer pipe when said motor-driven movement means are actuated; said rollers, said coils, and said crawlers being suspended from buoys.

Still more particularly, said raising means and said coils, and said motor-driven movement means, are suitable for being secured to one another and supported by a common support structure.

In an embodiment, said induction heater device is removable and is suitable for being applied on coaxial pipes resting on the sea bottom, the device including a said electromagnetic induction coil comprising two independent semi-cylindrical coil portions suitable for being secured to each other in order to form a coaxial coil surrounding said outer pipe.

Still more particularly, the two independent semi-cylindrical coil portions are mounted so as to be suitable for being moved relative to each other in the transverse direction perpendicular to the longitudinal direction of said pipes and of said coil so as to enable them to be installed on a pipe that is raised above the sea bed so as to form a coaxial coil surrounding said outer pipe.

Preferably, a coil is selected to be of sufficient length, preferably longer than at least five times its diameter when placed around the outer tube. The system can then be considered as being axisymmetric and invariant in translation along the common axis of the tubes and of the coil. The useful power is proportional to the square of the magnetic field, $H=NI/L$, that is generated in the coil. N is the number of turns, L is the length of the coil, and I is the current carried by each turn.

The greatest energy yield or efficiency is obtained when the section of the inner pipe ($e_2 \times 2\pi r_2$) is greater than the section of the outer pipe ($e_1 \times 2\pi r_1$).

It is possible to heat to higher temperatures by slowing down the rate of advance. The maximum temperature then depends on the thermal characteristics of the thermal insulation of the tube (U-value), on its diameter, and on the useful power. For pipes having a U-value of about 1 watt per square meter per kelvin ($W/m^2/K$) it is possible to heat to several hundreds of degrees without difficulty.

The frequency used always lies in the range 0 Hz to 50 Hz. It depends on the thickness of the barrier (the outer tube), on the electrical conductivity of the material from which the tubes are made, and on their magnetic permeability. Its order of magnitude is given by:

$$f = 1/\pi \gamma \mu \delta^2$$

δ: thickness of the outer tube;
γ: electrical conductivity of the outer tube;
μ: magnetic permeability of the outer tube;
f: frequency.

For certain particular materials, such as steel, an additional difficulty for calculation comes from the fact that magnetic permeability depends on the magnetic field in which it is placed.

The usual frequency lies in the range 0.01 Hz to 10 Hz. Specifically, if it is possible to generate very large magnetic fields, it is possible to heat considerably, even through large thicknesses of the outer tube and at frequencies that are very low, 0.01 Hz or less.

The maximum thickness that can be passed through depends on the desired useful power. For tubes made of ferromagnetic steel the yield of the heating operation increases with increasing the applied magnetic field. It is therefore necessary to verify whether, at the magnetic field and at the maximum power that it is possible to generate by varying frequency, an increase is obtained in the yield that is sufficient for obtaining the desired useful power.

By way of illustration, for inner and outer pipes made of ASTM A512 type construction steel having thermal capacity of about 1 $W/m^2/K$, with outer pipe thicknesses lying in the range 10 mm to 20 mm, inner tube thicknesses of more than 10 mm, and if magnetic fields are applied of the order of 0.1 T to 0.2 T over several meters, it is possible to obtain heating power of the inner tube going up to more than 50 kW per meter of coil and with a yield of better than 20%, ignoring losses due to producing power and transporting it to the coil. For inner pipes having an outside diameter in the range 4" to 12" with a power supply delivering about 800 kW, this makes it possible, per day, to heat up to 1.5 km of 12" inner pipe full of water to +40° C. above the ambient temperature of sea water, or 10 km of 4" inner pipe full of water.

BRIEF DESCRIPTION OF THE DRAWINGS

Other characteristics and advantages of the present invention appear from the following description given with reference to the accompanying drawings, which show an embodiment having no limiting character. In the figures.

DETAILED DESCRIPTION OF THE PRESENTLY PREFERRED EMBODIMENTS

Example 1

There follows a description of an example of a movable system for applying induction heating locally to a PIP type pipe 1 made of ASTM A512 type steel, which system is capable of heating a length of about 3 km of pipeline to 40° C. per day. The pipeline has a 12" inner tube full of water. The fluid contained in the pipeline generally has heat capacity greater than that of water. This example is given by way of illustration.

It is desired to heat the inner pipe 1a to 40° C. above the temperature of the sea water in less than 10 minutes (min) over a distance of the order of 10 meters (m), thus making it possible to travel approximately 1.5 kilometers per day per machine.

Figures 1, 2:
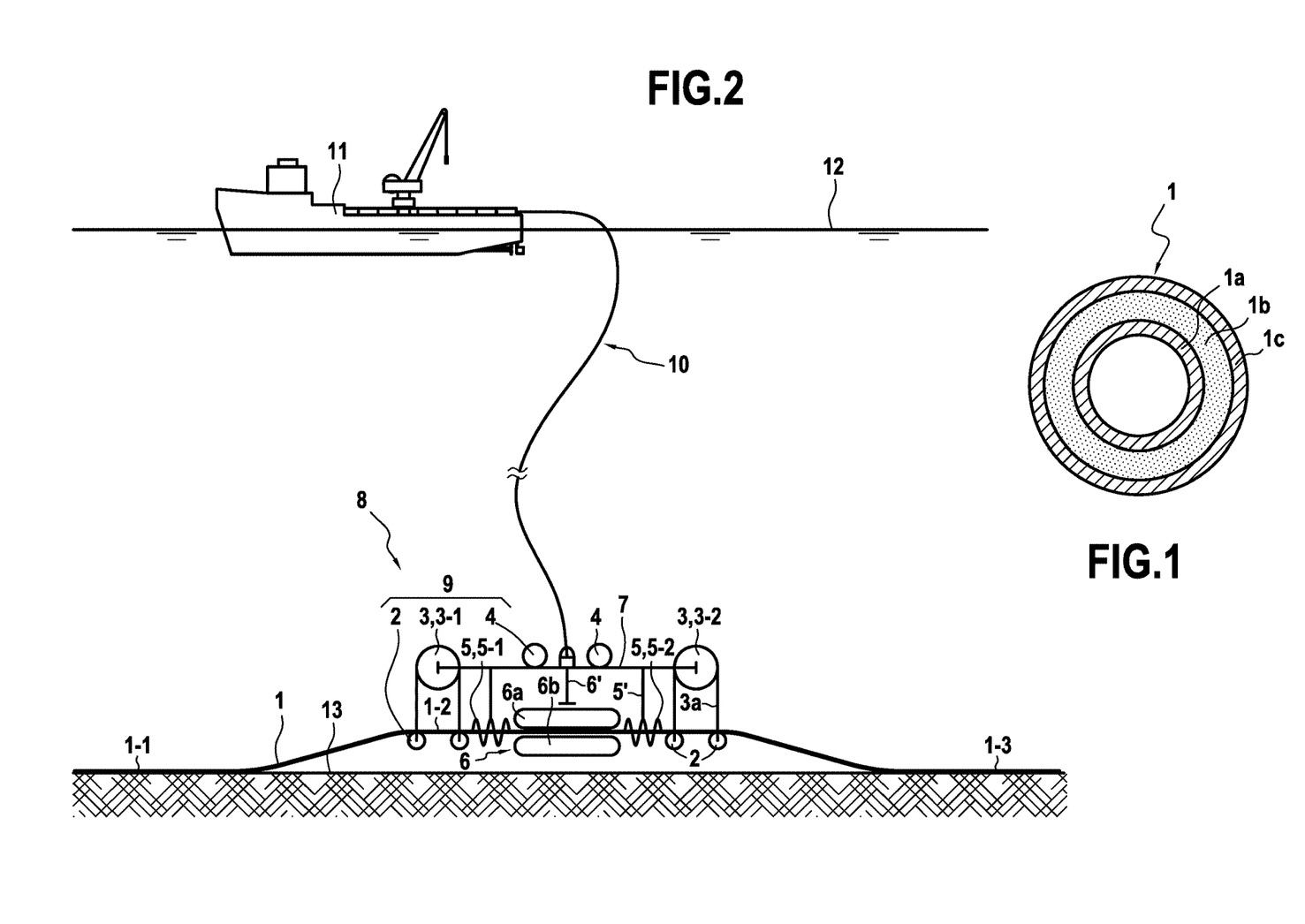
FIG. 1 is a diagrammatic cross-section view of an undersea pipe of PIP type.
FIG. 2 is a diagrammatic view of an induction heater installation suitable for being moved along the PIP type pipe.

The PIP comprises an outer pipe 1c, annular thermal insulation 1b based on aerogel, and an inner pipe 1a as shown in FIG. 1. The time required for the inner tube to cool from 40° C. to 20° C. is 24 h.

Two machines make it possible to reestablish the entire system in the event of total failure of the electrical heat tracing system.

The dimensions of the inner and outer pipes used are given below in Table 1 where ID=inside diameter and OD=outside diameter.

TABLE 1

| dimensions of the PIP |  |
|---|---|
| PIP dimensions | |
| Inner pipe | |
| ID (mm) | 279.4 |
| OD (mm) | 323 |
| Outer pipe | |
| ID (mm) | 412.6 |
| OD (mm) | 445.4 |
| Coil | |

TABLE 1-continued

| dimensions of the PIP |  |
|---|---|
| PIP dimensions | |
| ID (mm) | 460 |
| OD (mm) | 480 |

The energy that is useful for heating is the energy given off by the Joule effect in the inner tube. The inner tube is sufficiently well insulated to ensure that the energy given off by conduction is negligible throughout the entire time required for the machine to heat the 10 m long portion of pipeline. All of the energy given off by the Joule effect in the outer pipe or in the induction coil is considered as being lost. The constants for the materials used are as given in Tables 2 and 3 below.

TABLE 2

| thermal properties used | | |
|---|---|---|
| PIP heat capacity | Density (kg/m$^3$) | Cp (J/kg/K) |
| Steel | 7850 | 470 |
| Fluid | 1000 | 4185 |

The inner pipe is insulated from sea water with thermal insulation presenting a U-value of about 1 watt per square meter per kelvin ($Wm^{-2}K^{-1}$).

TABLE 3

| electromagnetic properties of the materials used | | |
|---|---|---|
| Electrical properties | Electrical conductivity (S/m) | Resistivity (Ω · m) |
| Copper (turns) | 5.80E+07 | 1.72E−08 |
| Steel (inner tube) | 2.00E+06 | 5.00E−07 |

Figure 1A:
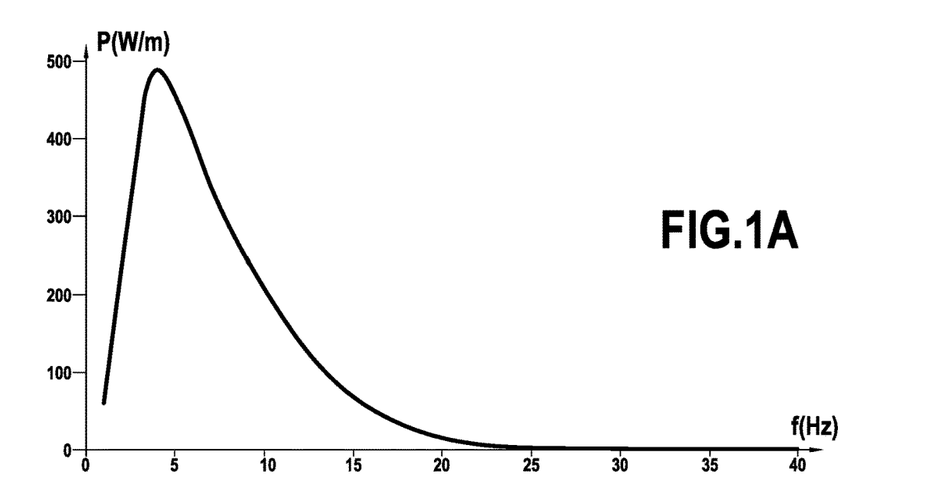
FIG. 1A is a graph plotting Joule effect losses in the inner tube as a function of the frequency of the electrical power in a coaxial coil surrounding the outer tube of the PIP type pipe.
Figure 1B:
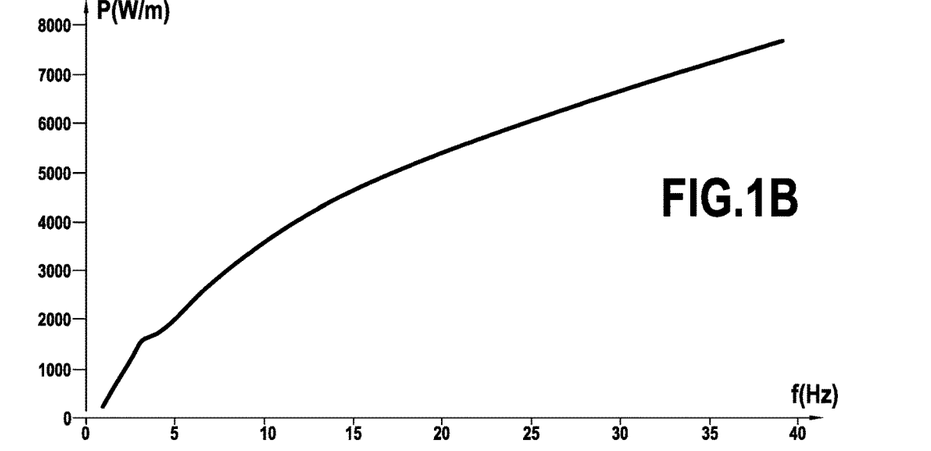
FIG. 1B is a graph showing the Joule effect losses in the outer tube as a function of the frequency of the electrical power in a coaxial coil surrounding the outer tube of the PIP type pipe.
Figure 1C:
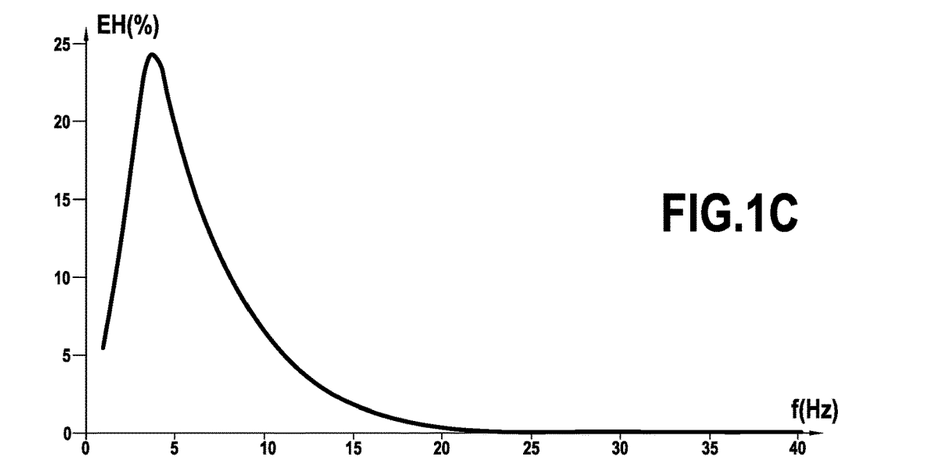
FIG. 1C is a graph plotting energy efficiency as a function of the frequency of the electrical power in a coaxial coil surrounding the outer tube of the PIP type pipe.

In FIG. 1C, energy efficiency is calculated as a function of frequency by calculating the ratio of the total power given off by the Joule effect in the inner tube over the total power delivered.

The curves of FIGS. 1A to 1C show that it is possible to perform induction heating of the inner pipe of this pipe-in-pipe providing electrical power is delivered to the coil surrounding the outer pipe at the specific frequency for maximum efficiency of 25% (which is about 4 Hz) corresponding to useful power for Joule effect heating of 25 kW per meter of coil, i.e. total power of 10×25=250 kW. This value makes the project feasible since the power needed to heat a 10 m long pipe string in 10 min is less than 250 kW.

Example 2

Movable Induction Heater Device

FIG. 2 shows a movable induction heater device 8 capable of heating up to 10 km of pipeline per day, depending on the pipe diameters, on the power available, and on the required heating power.

When restarting the pipeline, each movable device 8 begins by heating the PIP type pipe 1 to +40° C. above the surrounding temperature in order to destroy hydrate plugs.

The movable induction heater device 8 may be pre-installed when laying the PIP type pipe 1, or it may be installed on the pipe 1 resting on the sea bottom, as described in Example 3.

In operation, the entire movable device 8 is raised above the sea bed 13 by controlled deballasting of buoys 3, 4 as described below.

The main elements of the mobile induction heater device 8 are as follows:

a rigid support structure 7;

two induction coils 5, 5-1 and 5-2, that are spaced apart in the longitudinal direction of the pipe, being arranged coaxially around the outer pipe and serving to generate the varying magnetic field that is needed for heating the inner pipe, the coils 5 being secured to said support structure 7;

first buoys 3, 3-1 and 3-2 respectively downstream from the first coil 5-1 and upstream from the second coil 5-2, the first buoys 3 being secured to said support structure 7 and being suitable for raising said support structure 7 and the pipe 1;

second buoys 4 of Trelleborg subsea buoyancy type that are secured to the support structure 7 and that serve to control the controlled deballasting for raising the support structure 7 off the sea bed 13;

rollers 2 arranged against the underface of the outer pipe of the pipeline 1 and suspended from the first buoy 3 via ties 3a, the rollers 2 supporting the pipeline and being suitable for enabling movement relative to the pipeline 1 by relative sliding of the pipe 1 on the rollers 2 when the pipe 1 and the support structure 7 are raised by means of the first buoys 3, the movable device 8 being moved in translation relative to the pipeline 1; and a crawler device 6 supported by the support structure 7 and serving to move the movable device 8 along the PIP type pipe 1, with upper and lower crawler tracks 6a and 6b suitable for clamping the pipe between them by moving radially relative to the pipe using relative radial movement means 6'.

The support structure 7 thus supports the coils 5 and the crawler device 6 directly, and it supports the pipe 1 indirectly via the rollers 2.

The crawler device 6 is of the hydraulically powered type tensioner type (Huisman, 4C Offshore).

A transformer on the ship 11 at the surface 12 serves to transform three-phase alternating current (AC) electrical power at 400 volts (V) and 50 Hz on board the ship 11 at the surface 12 into equivalent power at a voltage higher than 10 kilovolts (kV) or more depending on the distance between the ship and the machine 8 so as to be transported with little power loss. This transport of electricity may be performed by means of an umbilical, generally a cable filled with oil that is a good electrical insulation. The machine 8 needs to have an AC source placed in a leakproof environment for generating single-phase AC in the frequency range 0.1 Hz to 50 Hz so to enable the induction coil to operate in optimum manner. The machine 8 is connected to the ship via an umbilical 10 comprising an undersea cable delivering both electrical and hydraulic power for operating the induction module and the movement module.

The method of using the movable induction heater device 8 thus comprises the following steps:

raising a longitudinal portion 1-2 of pipe 1 that takes on a hump-back shape with two pipe portions 1-1 and 1-3 resting on the sea bed 13 on either side of the portion 1-2 that forms a hump raised above the sea bed 13;

applying the crawlers 6 against the pipe 1;

applying the coils 5 around the pipe 1; and actuating the crawlers 6 so as to cause the entire heater device 8 (comprising the structure 7 and the elements 2, 3, 4, 5, and 6 that are secured thereto) to move relative to the pipe along the pipe while simultaneously shifting the raised hump-back portion along the pipe 1.

Figure 2A:
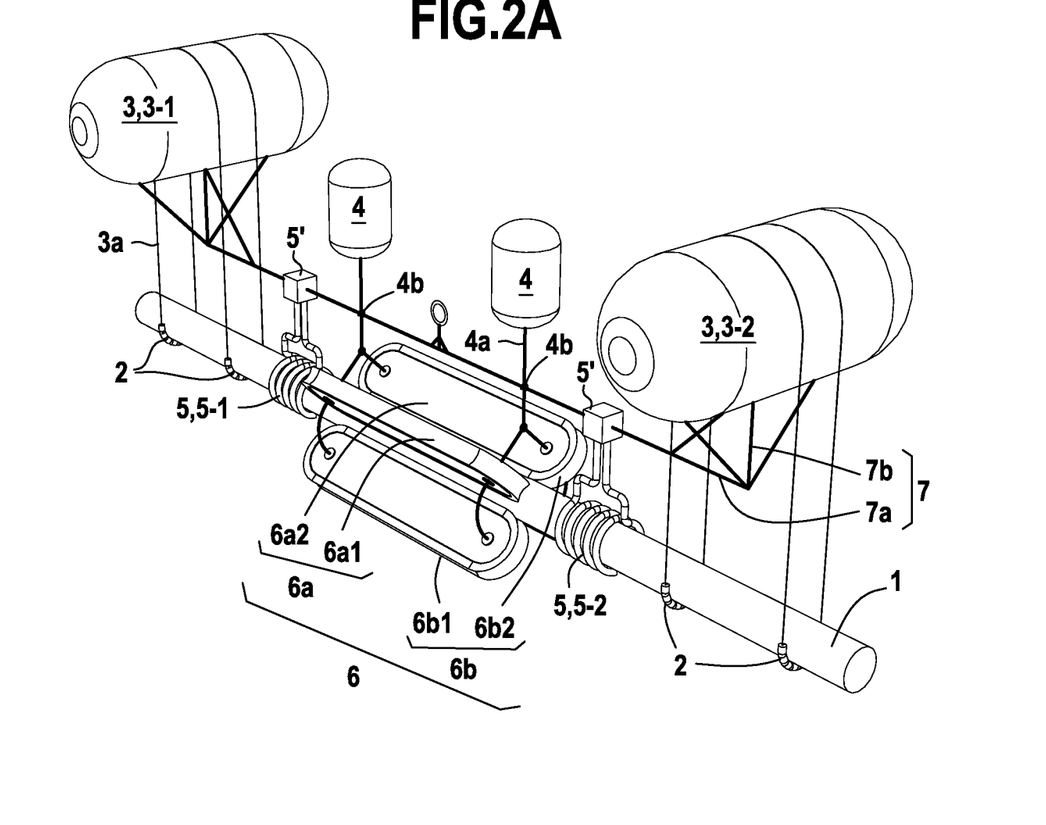
FIG. 2A shows a variant of the movable induction heater device.

In a variant, shown in FIG. 2A, the support structure 7 has rigid rods 7a, 7b that support and connect securely together the buoys 3-1 and 3-2. Each of the two buoys 3-1, 3-2 supports a tie 3a having a plurality of small rollers 2 mounted as a string on the tie 3a and located against the underface of the pipe 1. The crawler track device 6 arranged between the two coils 5-1 and 5-2 has endless loop type crawler tracks suitable for being pressed against the pipe by an actuator 6' (not shown), i.e.: two top crawler tracks 6a1, 6a2 and two bottom crawler tracks 6b1 and 6b2. The support structure 7 supports the two coils 5 via support modules 5'. The second buoys 4 support the crawler track device 6 via rigid vertical rods 4a secured at 4b to the horizontal rigid rod 7a of the support structure 7.

The coils 5 are constituted by single-layer or double-layer coils of the required power, having turns in the form of copper tubes that are cooled, e.g. by water. The coils are placed in a chamber filled with a specially designed fluid that does not come into contact with sea water.

In Examples 2A and 2B below, the pipes of the PIP type pipe were made of the materials of Example 1 and they were configured to take 24 h for cooling down from +40° C. to 20° C. with inner and outer pipes made of steel having thermal capacity of 1 W/m²/K in order to process a PIP type pipe having a length of 12 km in 24 h. The inner pipes were full of water.

Application Example 2a

Machine 8 pre-installed on the tube;
Inner pipe: outside diameter 4" and thickness 10 mm;
Outer pipe: outside diameter 8" and thickness 10 mm;
Induction coils: two 1 m coils 5, serving to generate a magnetic field of 0.1 (T) approximately, and each serving to generate a useful power of 50 kW;
400 kW AC source at a frequency of 4 Hz and a useful power of 100 kW; and
Travel speed of the device 8: 5.6 km/day.

Application Example 2B

Machine 8 pre-installed on the tube;
Inner pipe: outside diameter 12" and thickness 20 mm;
Outer pipe: outside diameter 16" and thickness 15 mm;
Induction coils: two 2 m coils 5, serving to generate a magnetic field of 0.1 (T) approximately, and each serving to generate a useful power of 100 kW;
800 kW AC source at a frequency of 2 Hz and a useful power of 200 kW; and
Travel speed of the device 8: 1.5 km/day.

Example 3

Removable Induction Heater Device

Figure 3:
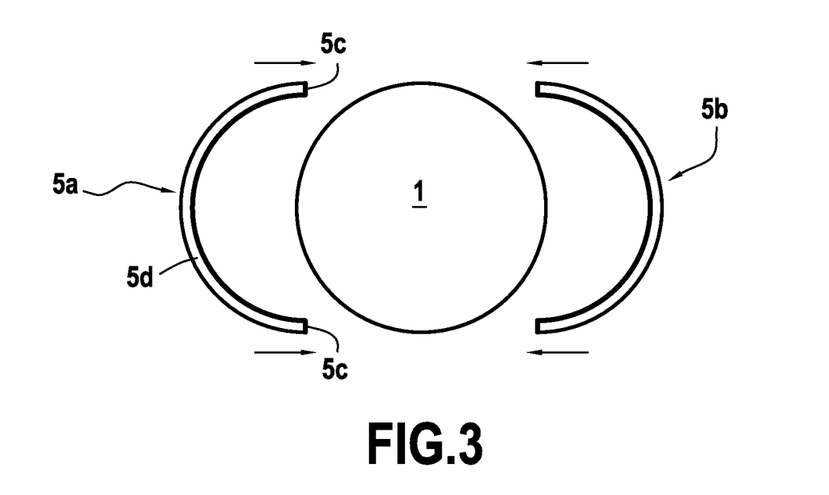
FIG. 3 is a diagrammatic view of a coil suitable for forming a removable induction heater installation that is suitable for being fitted around a PIP type pipe.
Figure 3A:
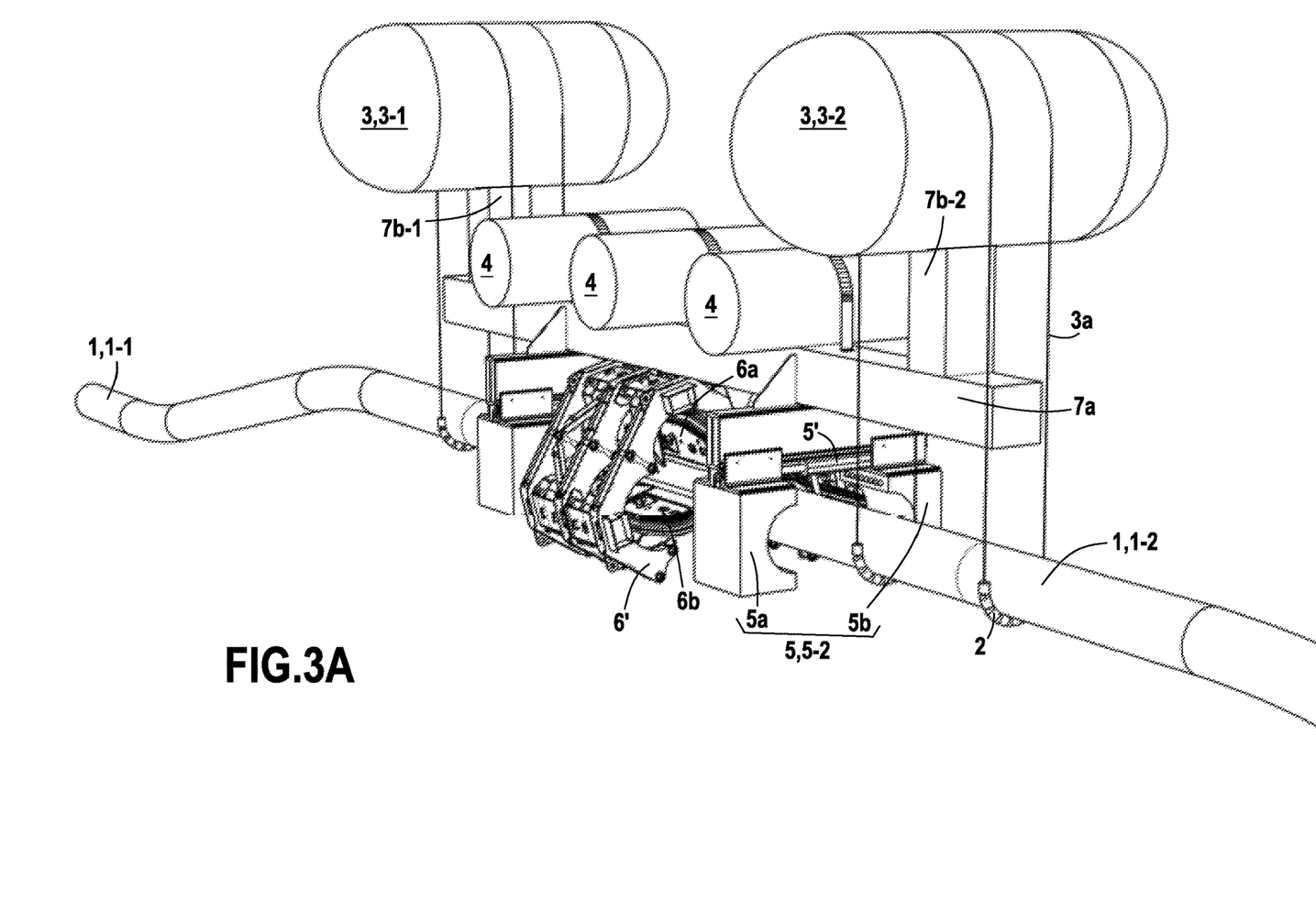
FIG. 3A shows a variant of the movable induction heater device having a removable coil 5.

This is a device that can be fitted locally on a pipe resting on the sea bottom in order to perform local heating, but it could equally well be used in the context of a movable device as described in Example 2 and shown in FIG. 3A.

The induction coil 5 shown diagrammatically in FIG. 3 comprises two symmetrical semi-cylindrical portions 5a and 5b that are suitable for surrounding the PIP type pipe and that are connected together by means of electrical connectors 5c at the ends of the half-turns 5d that they support.

These semi-cylindrical half-coils were prepared as described below.

Copper tubes were used of round section of about 1000 mm² or more for passing currents of the order of 10,000 amps (A) so as to have only a single layer of conductive tubes for connecting together.

The two portions 5a and 5b were connected together by flat connectors 5c or by connectors that engage one in another and of larger section. The water cooling circuits may be independent for the two portions of the coil.

The fabrication steps comprise:
bending the copper tube into standard coil turns;
cutting the resulting coil in an axial plane; and
welding a flat connector 5c to each end of each half-turn 5d.

In the movable device of FIG. 3A, the two half-coils 5a and 5b are mounted so as to be capable of moving in translation relative to each other on a transverse structure 5' under the horizontal beam 7a of the support structure 7.

It is thus possible to mount the coils 5 around the pipe 1 after the pipe 1 has been raised by the buoys 3 and 4 and without requiring the coils to be pre-installed.

More precisely in FIG. 3A, the support structure 7 is made up of three portions 7a, 7b-1, and 7b-2 that are initially independent and that are secured to one another prior to operation.

Vertical beams 7b-1 and 7b-2 are secured respectively to each of the buoys 3-1 and 3-2. A horizontal beam 7a secured to the second buoys 4 supports the coils 5 and the crawlers 6.

Initially, the buoys 3-1 and 3-2 together with the beams 7b-1 and 7b-2 are used so as to raise the portion 1-2 of pipe 1. To do this, they are positioned spaced apart along and above the pipe by using a remotely operated vehicle (ROV) (not shown) and the ties 3a supported by the buoys 3 are arranged around the pipe 1 with the rollers 2 against the underface of the pipe.

Thereafter, the horizontal central beam 7a with its buoys 4 is positioned between the vertical beams 7b-1 and 7b-2 so as to position the coils 5 and the crawlers 6 around the pipe 1. For this purpose, and once in position, the half-coils 5a and 5b are moved in translation as to form coils 5 that are arranged coaxially around the pipe 1, and the crawler tracks 6a and 6b are actuated radially by means of the actuator 6' so that they press against the pipe 1, and the beams 7b-1 and 7b-2 are fastened to the central beam 7a so as to form a common support structure 7.

The invention claimed is:

1. A method of heating an inner pipe of a set of coaxial steel pipes comprising an inner pipe and an outer pipe, wherein the inner pipe is heated by induction using an electromagnetic induction coil surrounding the outer pipe coaxially so as to maintain the temperature of the inner pipe at least 20° C. above the temperature of the water surrounding the outer pipe and to do so for a given duration, the coil passing electrical power at a frequency lower than 100 Hz optimized for maximum energy efficiency of Joule effect heating of the inner pipe.

2. The method according to claim 1, wherein the electromagnetic induction coil generates a magnetic field of strength of at least 0.1 teslas (T) with electrical power at an optimum frequency in the range 1 Hz to 10 Hz in order to obtain heating power of the inner pipe in the range 1 kW to 200 kW.

3. The method according to claim 1, wherein said pipes present the following characteristics:
outside diameter of said inner pipe lies in the range 5 cm to 40 cm;
outside diameter of said outer pipe lies in the range 7.5 cm to 50 cm; and
the thicknesses of said inner and outer pipes lie in the range 10 mm to 30 mm.

4. The method according to claim 1, wherein the inner pipe is heated to 40° C., the inner and outer steel pipes presenting the thermal capacity characteristics of pipe steels and the thermal insulation of the annular space between the inner and outer pipes being such that the time required for cooling from 40° C. to 20° C. is at least 24 h.

5. The method according to claim 1, wherein a movable induction heater device is used, which includes at least one said electromagnetic induction coil surrounding the outer pipe coaxially, and said movable heater device is moved along said set of coaxial pipes.

6. The method according to claim 5, wherein, the inner pipe is heated to a temperature T2 with a movable induction heater device including a said electromagnetic induction coil surrounding the outer pipe coaxially, and said movable heater device is moved at a speed of at least n km/day so that the temperature of the inner pipe for a given length of pipe remains greater than T1 less than T2, where T2-T1 is greater than the temperature drop of the inner pipe over one day.

7. The method according to claim 5, wherein the following steps are performed:
a) raising a portion of coaxial pipes resting on a sea bed, said pipe portion having at least one said induction coil arranged coaxially around the outer pipe; and
b) moving a movable induction heater device that includes at least one said electromagnetic induction coil lengthwise relative to and along said coaxial pipes while simultaneously raising a new portion of said coaxial pipes.

8. The method according to claim 1, wherein a removable induction heater device is used that is suitable for being applied on coaxial pipes resting on the sea bottom, said device including a said electromagnetic induction coil comprising two independent semi-cylindrical coil portions suitable for being secured to each other in order to form a coaxial coil surrounding said outer pipe when raised above the sea bed.

9. A device for induction heating an inner pipe of coaxial pipes, the device comprising:
induction heater means comprising at least one electromagnetic induction coil coaxially surrounding the outer pipe of the coaxial pipes; and
raising means for raising a portion of coaxial pipes above a sea bed together with said induction coil(s) surrounding it.

10. The device according to claim 9, wherein it is a movable device, further comprising:
motor-driven movement means suitable for enabling said induction coil(s) to move coaxially along the outer pipe of the coaxial pipes; and
said raising means for raising a portion of coaxial pipes above the sea bed together with said induction coil(s) surrounding it and said motor-driven movement means.

11. The device according to claim 10, wherein the motor-driven movement means comprise crawler devices suitable for bearing against the outer pipe and thus for moving along the outer pipe when they are actuated, said coils sliding coaxially relative to said outer pipe.

12. The device according to claim 10, wherein said raising means comprise rollers supporting the outer pipe and suitable for sliding relative to said outer pipe when said motor-driven movement means are actuated; said rollers, said coils, and said crawlers being suspended from buoys.

13. The device according to claim 9, wherein the raising means comprise buoys that can be ballasted or deballasted in controlled manner.

14. The device according to claim 9, wherein said raising means and said coils, and said motor-driven movement means, are suitable for being secured to one another and supported by a common support structure.

15. The device according to claim 9, wherein said induction heater device is removable and is suitable for being applied on coaxial pipes resting on the sea bottom, the device including a said electromagnetic induction coil comprising two independent semi-cylindrical coil portions suitable for being secured to each other in order to form a coaxial coil surrounding said outer pipe.

16. The device according to claim 15, wherein the two independent semi-cylindrical coil portions are mounted so as to be suitable for being moved relative to each other in translation transversely so as to enable them to be installed on a pipe that is raised above the sea bed so as to form a coaxial coil surrounding said outer pipe.

17. A method of heating an inner pipe of a set of coaxial steel pipes comprising an inner pipe and an outer pipe, wherein the inner pipe is heated by induction using an electromagnetic induction coil surrounding the outer pipe coaxially to 40° C., the coil passing electrical power at a frequency lower than 100 Hz optimized for maximum energy efficiency of Joule effect heating of the inner pipe, the inner and outer steel pipes presenting the thermal capacity characteristics of pipe steels and the thermal insulation of the annular space between the inner and outer pipes being such that the time required for cooling from 40° C. to 20° C. is at least 24 h.

18. A method of heating an inner pipe of a set of coaxial steel pipes comprising an inner pipe and an outer pipe, wherein the inner pipe is heated by a movable induction heater which includes at least one electromagnetic induction coil surrounding the outer pipe coaxially, the heater movable along the set of coaxial pipes, the coil passing electrical power at a frequency lower than 100 Hz optimized for maximum energy efficiency of Joule effect heating of the inner pipe, wherein the inner pipe is heated to a temperature T2 with the movable induction heater device, said movable heater device being moved at a speed of at least n km/day so that the temperature of the inner pipe for a given length of pipe remains greater than T1 less than T2, where T2-T1 is greater than the temperature drop of the inner pipe over one day.

* * * * *